United States Patent
Weber et al.

(10) Patent No.: US 8,179,587 B2
(45) Date of Patent: May 15, 2012

(54) ELECTROCHROMIC DEVICE

(75) Inventors: Brian T. Weber, Saint Anthony, MN (US); Erich C. Walter, Woodbury, MN (US); Eileen M. Haus, Saint Paul, MN (US); Ralph R. Roberts, Cottage Grove, MN (US); Kao Vang, Saint Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 139 days.

(21) Appl. No.: 12/340,915

(22) Filed: Dec. 22, 2008

(65) Prior Publication Data

US 2009/0174925 A1 Jul. 9, 2009

Related U.S. Application Data

(60) Provisional application No. 61/018,966, filed on Jan. 4, 2008.

(51) Int. Cl.
G02F 1/153 (2006.01)
(52) U.S. Cl. .......................................................... 359/269
(58) Field of Classification Search .................... 359/269
See application file for complete search history.

(56) References Cited

U.S. PATENT DOCUMENTS

| | | | |
|---|---|---|---|
| 4,733,284 A | 3/1988 | Aoki | |
| 5,720,904 A | 2/1998 | Jones | |
| 5,825,526 A | 10/1998 | Bommarito | |
| 5,919,571 A | 7/1999 | Badding | |
| 6,266,177 B1 * | 7/2001 | Allemand et al. | 359/265 |
| 6,631,022 B1 * | 10/2003 | Kihira et al. | 359/265 |
| 7,667,684 B2 * | 2/2010 | Jacobson et al. | 345/107 |
| 2004/0131934 A1 * | 7/2004 | Sugnaux et al. | 429/209 |
| 2005/0128561 A1 * | 6/2005 | Fitzmaurice et al. | 359/265 |
| 2005/0179012 A1 * | 8/2005 | Kwon et al. | 252/582 |
| 2006/0228564 A1 | 10/2006 | Demiryont | |
| 2008/0128286 A1 * | 6/2008 | Wu et al. | 205/95 |
| 2008/0128287 A1 | 6/2008 | Wu et al. | |
| 2008/0316573 A1 * | 12/2008 | Shim et al. | 359/265 |

FOREIGN PATENT DOCUMENTS

| | | | |
|---|---|---|---|
| EP | 1 244 168 | * | 9/2002 |
| WO | 95/11512 | | 4/1995 |
| WO | WO 2005/062110 | | 7/2005 |
| WO | WO 2006/016729 | | 2/2006 |
| WO | WO 2007/027377 | | 3/2007 |

OTHER PUBLICATIONS

European Patent Office (EPO) written opinion of application EP 08 86 9692 dated Jun. 29, 2011.*
U.S. Appl. No. 11/566,548, filed Dec. 4, 2006, Wu.
U.S. Appl. No. 11/566,541, filed Dec. 4, 2006, Wu.
U.S. Appl. No. 11/566,509, filed Dec. 4, 2006, Wu.
All Sol-Gel Electrochromic Devices with Li+ ionic Conductor, WO3 Electrochromic Films and SnO2 Counterelectrode Films. Journal of Sol-gel Science and Technology (1998), 11(1), 87-104.

(Continued)

Primary Examiner — Joseph P Martinez

(57) ABSTRACT

An electrode that includes a transparent substrate having a first and second surface; a conductive layer disposed on the second surface of the substrate; and an electrode layer disposed on the conductive layer, wherein the electrode layer includes doped tin oxide nanoparticles and an organic binder, and wherein the electrode layer is transparent. Also disclosed is a method of making such an electrode and electrochromic articles including such an electrode.

12 Claims, 2 Drawing Sheets

OTHER PUBLICATIONS

All-Solid-State Electrochromic Window of SnO2/Mo and Electrodeposited WO3 Film with Poly9Acrylonitrile) Gel Electrolyte. Proceedings of SPIE—The International Society for Optical Engineering (2000); 4104 (Organic Photorefractives, Photoreceptors, and Nanocomposites), 50-56.

RF Sputtered Sn02, Sn-Doped In203 and Ce-Doped TiO2 Films as Transparent Counter Electrodes for Electrochromic Window. Bulletin of the Korean Chemical Society (1998), 19(1), 107-109.

Electrochemical and Spectroelectrochemical Properties of Sn02 and Sn02/Mo Transparent Electrodes With High-Storage Capacity: Journal of the Electrochemical Society (1997), 144(10), 3398-3409.

Optical and Electrochemical Properties of Sn02:Sb Thin Films Prepared by the Sol-Gel Process. Molecular Crystals and Liquid Crystals v. 447 2006, p. 243 (561)-250/(568).

Roll-to-Roll DC Magnetron Deposition of Tunsten Oxide and Vanadium Oxide for Use in Transmissive Electrochromic Devices. Maki, S.P. (3M Corporate Research, St. Paul, MN, USA); Nachbor, M.D.; McClure, D.J. Proceedings, Annual Technical Conference—Society of Vacuum Coaters 1996 Soc. Of Vacuum Coaters, Albuquerque, NM, USA, p. 348-352.

Comparative Studies of "All Sol-Gel" Electrochromic Windows Employing Various Counter-Electrodes: Solar Energy Materials and Solar Cells (2002) 73(1), 21-37, CODEN:SEMCEQ:ISSN:0927-0248.

* cited by examiner

ELECTROCHROMIC DEVICE

CROSS REFERENCE TO RELATED APPLICATIONS

This application claims the benefit of U.S. Provisional Patent Application No. 61/018,966, filed Jan. 4, 2008, the disclosure of which is incorporated by reference herein in its entirety.

FIELD

The present disclosure relates to electrodes, methods of forming electrodes and electrochromic articles including such electrodes.

BACKGROUND

Electrochromic materials undergo a reversible change of color due to their oxidation or reduction. Devices incorporating these materials have been utilized in the construction of mirrors, displays, and windows for example. Nanoparticle based films can be useful in many electrochemical applications, examples of which include electrochromic devices, batteries, and solar cells. It is often desirable, given the final application of the device, for an electrochromic device to be optically transparent. Methods of producing optically transparent electrochromic devices and articles are therefore also desirable.

BRIEF SUMMARY

Disclosed herein is an electrode that includes a transparent substrate having a first and second surface; a conductive layer disposed on the second surface of the substrate; and an electrode layer disposed on the conductive layer, wherein the electrode layer includes doped tin oxide nanoparticles and an organic binder, and wherein the electrode layer is transparent.

Also disclosed herein is an electrochromic article that includes a counter electrode including: a transparent substrate having a first and second surface; a conductive layer disposed on the second surface of the substrate; and an electrode layer disposed on the conductive layer, wherein the electrode layer includes doped tin oxide nanoparticles, and an organic binder, wherein the electrode layer is transparent; and an electrolyte layer disposed on the counter electrode.

Also disclosed herein is a method of forming an electrode that includes the steps of coating an electrode coating composition on a transparent substrate, the electrode coating composition including: doped tin oxide nanoparticles, organic binder and at least one solvent; and drying the coated electrode coating composition to remove at least a portion of the at least one solvent from coated electrode coating composition.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
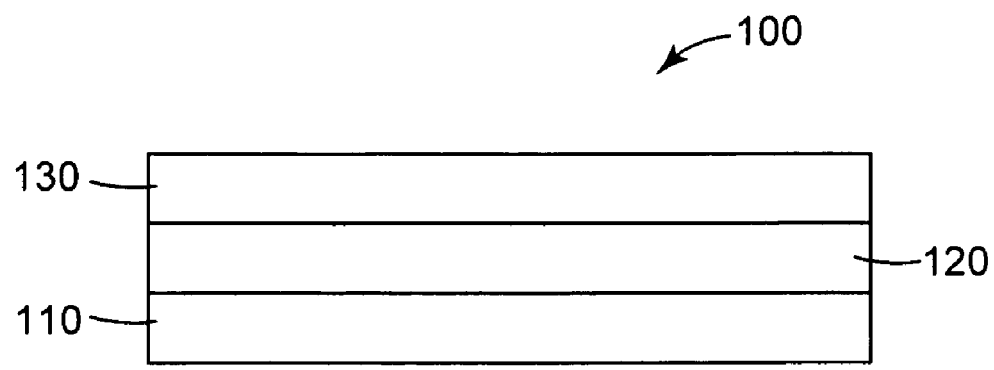
FIG. 1 illustrates an exemplary electrode as disclosed herein.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" include plural referents unless the content clearly dictates otherwise. Thus, for example, reference to a composition containing "a nanoparticle" includes two or more nanoparticles. As used in this specification and the appended claims, the term "or" is generally employed in its sense including "and/or" unless the content clearly dictates otherwise.

Disclosed herein is a method of forming an electrode that includes coating an electrode coating composition on a substrate, wherein the electrode coating composition includes doped semiconductive particles, organic binder and at least one solvent, and drying the coating composition to remove at least a portion of the at least one solvent from the coated electrode coating composition.

The electrode coating composition as disclosed and utilized herein generally includes doped semiconductive particles, organic binder and solvent. The doped semiconductive particles function to provide desired electrical and optical properties to the articles formed using the electrode coating composition. The electrode coating composition can contain one kind of doped semiconductive particle, or more than one kind of doped semiconductive particle. The electrode coating composition can contain one size (or average size) of doped semiconductive particle or more than one size (or average size) of semiconductive particle.

In an embodiment, the doped semiconductive particle can be a doped metal oxide particle. Doped metal oxide particles that can be utilized in the electrode coating composition can include doped metal oxide nanoparticles. Generally, nanoparticles are particles that have a diameter of less than about 1000 nanometers (nm). In another embodiment, the metal oxide particles are nanoparticles that have a diameter that renders them optically transparent when they are included in an electrode layer. In an embodiment, the metal oxide nanoparticles have an average diameter of not greater than about 100 nm. In an embodiment, the metal oxide nanoparticles have an average diameter of not greater than about 50 nm. In an embodiment, the metal oxide nanoparticles have an average diameter of not greater than about 30 nm. As used herein, "average diameter" refers to the average nominal diameter of a particle.

In an embodiment, the metal oxide nanoparticles have an average diameter of not greater than about 20 nanometers. In another embodiment, the metal oxide nanoparticles have an average diameter of not greater than about 15 nanometers.

The doped metal oxide particles that can be utilized in the electrode coating composition can include those doped with Group III or Group V elements. In an embodiment, the doped metal oxide particles can be doped with boron (B), aluminum (Al), gallium (Ga), indium (In), thallium (Tl), nitrogen (N), phosphorus (P), arsenic (As), antimony (Sb), and bismuth (Bi) for example. In an embodiment, the doped metal oxide particles can be doped with antimony (Sb), indium (In) and phosphorus (P), for example. In an embodiment, the doped metal oxide particles can be doped with phosphorus (P) for example.

The doped metal oxide particles that can be utilized in the electrode coating composition can include any metal oxide that has or can be made to have semiconductive properties. In an embodiment, the metal oxide is a Group IV oxide. Exemplary Group IV oxides that can be utilized include silicon oxide ($SiO_2$), germanium oxide ($GeO_2$), and tin oxide ($SnO_2$), for example. In an embodiment, the metal oxide is tin oxide ($SnO_2$).

Doped metal oxide particles for use in the electrode coating composition can be obtained commercially or can be made. Exemplary phosphorus doped tin oxide particles that can be utilized in an electrode coating composition as discussed herein can be obtained from Nissan Chemical America Corporation (Houston Tex.). Alternatively, phosphorus doped tin oxide can be produced according to methods known to those of skill in the art. One such exemplary method for producing phosphorus doped tin oxide can be found in U.S. Pat. No. 5,720,904.

The amount of doped semiconductive particles present in the electrode coating composition are generally at a level that provides the desired optical and electrical properties while maintaining electron mobility throughout the layer that is formed thereby. In an embodiment, the doped semiconductive particles account for about 5% to about 50% by weight of the total electrode coating composition. In an embodiment, the doped semiconductive particles account for about 15% to about 30% by weight of the total electrode coating composition. In an embodiment, the doped semiconductive particles account for about 20% to about 25% by weight of the total electrode coating composition. In an embodiment where the doped semiconductive particles are phosphorus doped tin oxide particles, they can account for about 22% by weight of the total electrode coating composition.

Electrode coating compositions as discussed and utilized herein also include an organic binder. Organic binders are generally materials that can function as viscosity modifiers, have film forming properties, can add mechanical strength to films that are formed therewith, or some combination thereof. The electrode coating composition may contain one organic binder or more than one organic binder. Generally, the at least one organic binder has at least a minimal solubility in the electrode coating composition. Generally, the at least one organic binder material is compatible with other components, such as the solvent in the electrode coating composition. Also, the at least one organic binder is generally compatible with the other components of the electrode coating composition so that a homogenous solution is created and maintained when the electrode coating composition is formed. It is also generally desirable that the organic binder not be soluble in other materials that it may come in contact with. A specific example of this includes the organic binder material being insoluble in the electrolyte with which the counter electrode may be in contact with in an electrochromic article.

In one embodiment, organic binder materials that can be utilized include high molecular weight polymers. Exemplary materials include, but are not limited to polyethylene oxide (PEO), polyvinyl alcohol (PVA), polyacrylic acid (PAA) and poly (meth)acrylates for example. In one embodiment, the organic binder is an alkyl cellulose ether. Examples of alkyl cellulose ethers include, but are not limited to methyl cellulose, or ethyl cellulose, including derivatives thereof such as hydroxypropyl methyl cellulose and hydroxyl ethyl cellulose. In one embodiment, a methyl cellulose ether is utilized. Suitable methyl cellulose ethers are commercially available from Dow Chemical (Midland Mich.). Specific examples of methyl cellulose ethers that can be utilized include METHOCEL E4M from Dow Chemical.

The amount of organic binder included in the electrode coating composition is generally at a level that provides desired mechanical stability and allows the electrode coating composition to be evenly coated onto the surface. In an embodiment, the organic binder accounts for about 0.5% to about 5% by weight of the total electrode coating composition. In another embodiment, the organic binder accounts for about 1% to about 3% by weight of the total electrode coating composition. In another embodiment, the organic binder accounts for about (1%) by weight of the total electrode coating composition.

Electrode coating compositions as discussed and utilized herein also include at least one solvent. The at least one solvent generally functions to mix the organic binder and the doped semiconductive particles together (as well as any optional components) to form a homogeneous composition. The at least one solvent can also function to allow the electrode coating composition to be coated onto a substrate. In one embodiment therefore, any solvent that can accomplish these function(s) can therefore be included in an electrode coating composition. Electrode coating compositions disclosed herein can generally include one solvent, or more than one solvent. The desired viscosity of the electrode coating composition depends at least in part on the particular coating method that will be used (and in some cases therefore the identity and amount of the at least one solvent).

In an embodiment, the solvent system and the drying method can be adjusted to allow the "dried down" doped tin oxide and binder components to form a film having good substrate adhesion and high optical transparency. The rate of drying of the solvent is at least partially dictated by its vapor pressure (VP). Examples of slow drying polar solvents include N-methylpyrrolidone (VP 0.5 mmHg at 25° C.) and dimethyl formamide (VP 2.7 at 20° C.). Examples of faster drying polar solvents include ethanol (VP 59.3 mm Hg at 20° C.), methanol (VP 128 mm Hg at 20° C.). In an embodiment, when the binder is a hydrophilic alkyl cellulose ether, the at least one solvent is a polar solvent. In an embodiment, the at least one solvent is a solvent with a high vapor pressure for example, a solvent with a vapor pressure greater than about 50 mm Hg at 20° C.). In an embodiment, the at least one solvent is a polar solvent with a high vapor pressure. In one embodiment, the electrode coating composition can include water. In an embodiment, the at least one solvent can include an alcohol, an acetate such as ethyl acetate (VP 100 mm Hg at 27° C.), a ketone such as 2-butanone (VP 71 mm Hg at 20° C.), or a combination thereof. In an embodiment, the at least one solvent includes water and an alcohol. In yet another embodiment, the electrode coating composition includes water and methanol as solvents. In an embodiment, any portion of the solvent (or solvents) can be a component of one of the other components in the electrode coating composition. In an embodiment for example, the doped semiconductive particles can be added to the electrode coating composition in a solution containing at least one of the solvents, a portion of one of the solvents, more than one solvent, or a portion of more than one solvent.

The amount of solvent included in the electrode coating composition is generally at a level that provides a composition that can be homogeneously coated on a surface, can be relatively easily dealt with from a process standpoint, and can be dried in a reasonable amount of time. In an embodiment, the solvent accounts for about 50% to about 90% by weight of the total electrode coating composition. In an embodiment, the solvent accounts for about 65% to about 75% by weight of the total electrode coating composition. In an embodiment, the solvent accounts for about 70% to about 75% by weight of the total electrode coating composition.

In an embodiment where the electrode coating composition includes water as at least part of the solvent, the water can generally account for about 0% to about 90% by weight of the total electrode coating composition. In another embodiment where the electrode coating composition includes water as at least part of the solvent, the water can generally account for about 25% to about 50% by weight of the total electrode coating composition. In another embodiment where the electrode coating composition includes water as at least part of the solvent, the water can generally account for about 30% to about 40% by weight of the total electrode coating composition. In another embodiment where the electrode coating composition includes water as at least part of the solvent, the water can generally account for about 35% to about 36% by weight of the total electrode coating composition.

The electrode coating composition can also include optional components. Optional components can be added to affect properties of the composition that may be relevant to the coating of the composition for example. For example, surfactants, defoamers, leveling agents, dispersants, UV light absorbers or hindered amine light stabilizers could be added to the electrode coating composition. The identities and amounts of such optional additives would be known to one of skill in the art attempting to modify a particular property of the electrode coating composition.

The electrode coating composition as discussed above can be coated on a substrate using methods as generally known to one of skill in the art. Generally, coating methods that can produce substantially uniform coatings are utilized. Examples of such methods include, but are not limited to, knife coating, screen printing, extrusion coating, gravure coating, reverse gravure coating, spin coater, dip coater, roll coater, slide coater, slot coater, curtain coater, ink jet coating and metering rod (Meyer bar) coating.

The electrode coating composition as discussed herein is coated onto a substrate. The type of substrate that can be used will depend at least in part on the final application and purpose of the article that is being fabricated. In one embodiment, the substrate can be transparent. The substrate can be either rigid or flexible. Embodiments disclosed herein provide the advantage of utilizing low drying temperatures which allows plastic substrates to be utilized. Examples of substrates include but are not limited to glass, polyethylene terephthalates (PETs), polyimides, polyethylene naphthalates (PENs), polycarbonate, poly (ether etherketone) (PEEK), poly (ether sulfone) (PES), polyarylates (PAR), and polycyclic olefin (PCO). The substrate can also be a component of another device or the surface of another device or structure. The thickness of the substrate can vary based on the final application and purpose of the device that is being fabricated. In an embodiment, a substrate that has a thickness that is at least about 2 mils (about 50 μm) can be utilized. In another embodiment, a substrate that has a thickness that is at least about 5 mils (about 127 μm) can be utilized.

The substrate can also include a conductive layer, on which the electrode coating composition is applied. The conductive layer can include, but is not limited to, metal oxides such as indium tin oxide (ITO), tin oxide, fluorine doped tin oxide (FTO), zinc oxide, and antimony doped tin oxide (ATO). In other embodiments, vapor-deposited or electroless plated transparent metal films can be made using gold (Au), or silver (Ag); composites containing conductive nanowires; or thin carbon or metal grids can be utilized as the conductive layer. In one embodiment, a highly conductive polymer film, such as a highly conductive poly(3,4-ethylenedioxythiophene) (PEDOT) film, can be coated (by appropriate methods) onto a substrate to function as the conductive layer.

One of skill in the art will also understand, having read this specification, that a commercially available metal oxide coated substrate can also be utilized as the substrate and conductive layer as discussed in this particular embodiment. In embodiments that utilize a metal oxide coated substrate, the coating thickness of the conductive layer can generally be quantified by the resistivity of the sheet. The sheet resistivity is generally measured in ohms/sq. Generally, substrates that have a conductive layer that has a sheet resistivity from about 10 ohm/sq to about 300 ohm/sq can be utilized. In an embodiment, substrates that have a conductive layer that has a sheet resistivity from about 20 ohm/sq to about 150 ohm/sq can be utilized. Such conductive coated substrates are commercially available from a number of sources, including but not limited to, Sheldahl (Northfield, Minn.), Techni-met (Windsor, Conn.) and 3M Company (St. Paul, Minn.).

Generally, the electrode coating composition is coated onto the substrate (whether it includes a conductive layer or not) at a wet thickness that is sufficient to provide a coating having a desired thickness once dried. In an embodiment, the electrode coating composition can be coated onto the substrate at a thickness from about 0.2 mils (5.08 μm) to about 4 mils (100.8 μm). In an embodiment, the electrode coating composition can be coated onto the substrate at a thickness from about 0.4 mils (10.16 μm) to about 1.8 mils (45.7 μm). In an embodiment, the electrode coating composition can be coated onto the substrate at a thickness from about 0.5 mils (12.7 μm) to about 1.5 mils (38.1 μm).

In an embodiment, the electrode coating composition can be coated using a Mayer bar in the range of a number 24 to a number 46. These bars will produce coatings having dry thicknesses of about 0.25 mil (6.3 μm) to about 0.54 mil (13.7 μm). In another embodiment, the electrode coating composition can be coated using a number 75 Mayer bar, which will produce a coating having a dry thickness of about 0.72 mil (18.3 μm).

After the electrode coating composition is coated onto the substrate the coated layer of electrode coating composition is then dried. Drying the coated electrode coating composition forms an electrode layer. Generally, drying functions to remove at least a portion of the solvent from the coated electrode coating composition layer. In an embodiment, drying functions to remove substantially all of the solvent from the coated electrode coating composition.

Drying can generally be carried out as is known to one of skill in the art. In an embodiment, drying can be carried out while controlling the temperature. In an embodiment, drying can be carried out at a temperature that is higher than average room temperature (25° C.). In an embodiment, drying is carried out at or below about 300° C. In an embodiment, drying is carried out at or below about 150° C. In an embodiment, drying is carried out at or below about 120° C. In an embodiment, drying is carried out at or below about 110° C. In an embodiment, drying can be carried out at about 110° C. The thickness of the coating may affect the temperature of drying, e.g. a thinner coating may be able to be dried at lower temperatures than a thicker coating could be. One of skill in the art would know how to affect drying of the coated electrode composition by controlling the temperature of drying. For example, a convection oven can be utilized.

Drying can also be carried out while controlling air flow around the coated electrode composition. In an embodiment, drying is carried out with air flow that is increased from normal conditions. In an embodiment, drying is carried out with forced air circulation. In an embodiment, drying can be carried out with at least 13 cubic feet/minute of air (e.g. fresh air at about 70° F.) intake with the exhaust for that intake being 75 cubic feet/minute at 350° F. air temperature. One of skill in the art would know how to affect drying of the coated electrode composition by controlling the airflow. For example, a forced air oven, can accelerate the drying process.

Drying can also be carried out while both controlling the temperature and the air flow. In an embodiment where the electrode coating composition is coated onto a flexible substrate, drying can be carried out at a temperature below about 120° C. and with forced air circulation.

Methods of fabricating electrodes or electrochromic articles can also include further steps, other than those specifically discussed herein, that may be desirable for manufacturing layers or structures on the article. One of skill in the art would know particular layers or structures that may be desirable and would also know exemplary methods of making the structures.

An example of an electrode that can be made using methods disclosed herein is depicted in FIG. 1. FIG. 1 shows electrode 100 that includes an exemplary substrate 110 upon which an exemplary conductive layer 120 is disposed, and upon which an exemplary electrode layer 130 is disposed. The substrate 110 and the conductive layer 120 were discussed above. The electrode layer 130 can result from drying the coated electrode coating composition. The electrode layer 130 is generally conductive, has a relatively low haze, has a relatively high clarity, and has a relatively high total transmission within the visible range.

The electrode layer generally has a (dry) thickness from about 0.1 mil (2.54 µm) to about 0.8 mil (20.32 µm). In an embodiment, the electrode layer generally has a thickness from about 0.12 mil (3 µm) to about 0.54 mil (13.7 µm). In an embodiment, the electrode layer generally has a thickness from about 0.25 mil (6.3 µm) to about 0.54 mil (13.7 µm).

The electrode layer will generally include doped semiconductive particles, organic binder, and any optional additives that were included in the electrode coating composition. Drying the coated electrode coating composition removes at least a substantial portion of the solvent that was present in the electrode coating composition.

The amount of doped semiconductive particles present in the electrode layer can be at a level that provides the desired electrical properties while maintaining mobility throughout the layer. In an embodiment, the doped semiconductive particles account for about 85% to about 99% by weight of the total electrode layer. In an embodiment, the doped semiconductive particles account for about 92% to about 96% by weight of the total electrode layer.

The amount of organic binder included in the electrode layer can be at a level that provides desired mechanical stability. In an embodiment, the organic binder accounts for about 1% to about 15% by weight of the total electrode layer. In another embodiment, the organic binder accounts for about 1% to about 12% by weight of the total electrode layer. In another embodiment, the organic binder accounts for about 4% to about 8% by weight of the total electrode layer.

An electrode in accordance with this disclosure, which is made up of the electrode layer in combination with the substrate and the conductive layer is generally relatively conductive. In an embodiment, the electrode generally has a conductivity on the order of at least $10^2$ ohms/square. In an embodiment, the electrode generally has a conductivity on the order of $10^3$ ohms/square.

An electrode in accordance with this disclosure, which is made up of the electrode layer in combination with the substrate and the conductive layer generally has a relatively low haze. In an embodiment, the electrode generally has a percent haze that is not greater than about 15%. In an embodiment, the electrode generally has a percent haze that is not greater than about 5%. In an embodiment, the electrode generally has a percent haze that is not greater than about 2%.

An electrode in accordance with this disclosure, which is made up of the electrode layer in combination with the substrate and the conductive layer generally has a relatively high clarity. In an embodiment, the electrode generally has a percent clarity that is at least about 90%. In an embodiment, the electrode generally has a percent clarity that is at least about 95%. In an embodiment, the electrode generally has a percent clarity that is at least about 99%.

An electrode in accordance with this disclosure, which is made up of the electrode layer in combination with the substrate and the conductive layer generally has a relatively high total transmission. In an embodiment, the electrode generally has a percent total transmission that is at least about 80%. In an embodiment, the electrode generally has a percent total transmission that is at least about 85%. The transmission at specific wavelengths of electrodes as disclosed herein can also be determined. In an embodiment, the transmission at 550 nm may provide the largest change from the clear to the dark state of the electrochromic device.

Electrodes and electrode layers as disclosed herein can be utilized within larger electrochromic articles. An example of such an electrochromic article can be seen in FIG. 2. Such an exemplary article includes a counter electrode 225, and an electrolyte layer 240. In such an embodiment, the electrolyte layer 240 is disposed on the counter electrode 225. The counter electrode 225 in this embodiment can include the electrode exemplified in FIG. 1, and described above.

The electrolyte layer functions to facilitate the transfer of electrical charge from a ground potential or a current source. Examples of electrolytes that can be used to form the electrolyte layer include, but are not limited to, solvent based liquid electrolytes, polyelectrolytes, polymeric electrolytes, solid electrolytes, gel electrolytes, and UV curable electrolytes. Examples of specific electrolyte salts that can be utilized include, but are not limited to poly(vinyl imidazolium halide) and lithium iodide, poly(vinyl pyridinium salts), LiN(CF$_3$SO$_2$)$_2$ (commercially available as Fluorad HQ 115 from 3M, St. Paul Minn.), LiCF$_3$(SO$_3$) (lithiumtriflate) (commercially available from 3M, St. Paul Minn.). LiClO$_4$, LiPF$_6$, and LiBF$_4$.

A curable electrolyte can also be utilized. An example of a curable electrolyte is disclosed in U.S. patent application Ser. No. 11/566,509, filed on Dec. 4, 2006, entitled "CURABLE ELECTROLYTE", the disclosure of which is incorporated herein by reference.

Figure 2:
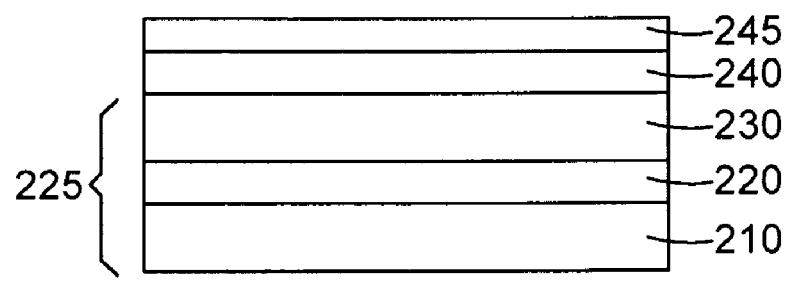
FIG. 2 illustrates an exemplary electrochromic article as disclosed herein.

An embodiment of an electrochromic article can also include an optional release liner 245 positioned on the electrolyte layer 240 (depicted in FIG. 2). The release liner 245 can be formed of any useful material such as, for example, polymers or paper and may include a release coat. Suitable materials for use in release coats include, but are not limited to, fluoropolymers, acrylics and silicones designed to facilitate the release of the release liner 245 from the electrolyte layer 240. Such an embodiment could be useful if the counter electrode/electrolyte were manufactured and sold separately from the remaining components of an electrochromic device.

Figure 3:
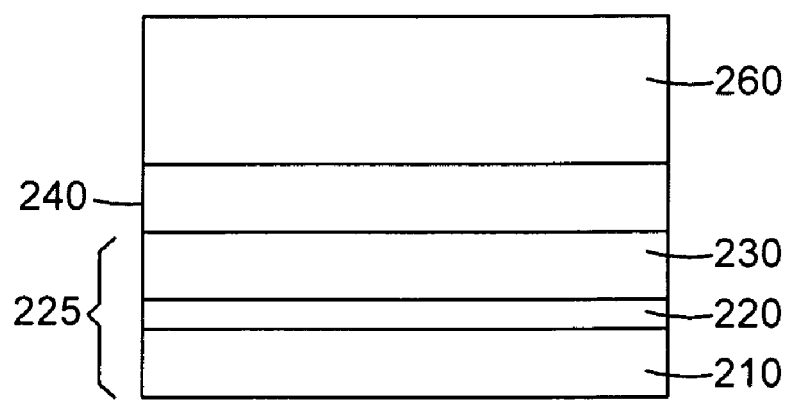
FIG. 3 illustrates an exemplary electrochromic article as disclosed herein.

Yet another embodiment, an example of which is depicted in FIG. 3 includes a counter electrode 225 that includes a first substrate 210, a first conductive layer 220, and an electrode layer 230; an electrolyte layer 240; and a working electrode 260. The counter electrode 225, and the electrolyte layer 240 are generally as described above.

The working electrode 260 can be fabricated by any method known to those of skill in the art. Exemplary methods of forming working electrode 260 include, but are not limited to printing, electrodeposition, electrophoretic deposition, sputtering, and vapor coating. U.S. Pat. Nos. 5,825,526 and 5,919,571, the disclosures of which are incorporated herein by reference, provide two specific examples of methods of fabricating a working electrode. In another embodiment, the working electrode 260 can be formed as disclosed in the patent applications entitled "Electrochromic Device", U.S. patent application Ser. No. 11/566,548 and "Electrochromic Device Based on Layer by Layer Deposition" U.S. patent application Ser. No. 11/566,541, which were both filed on Dec. 4, 2006, the disclosures of which are incorporated herein by reference.

As one of skill in the art will understand, electrochromic articles discussed herein can also include other optional layers and components. For example, electrochromic articles can also include electrode separators, such as spacer beads or another type of electrode separator. Generally, electrode separators are made of non-conducting material. Electrode separators can be organic or inorganic. In an embodiment, where the device is partially glass, i.e. is formed on a glass substrate, spacer beads can be utilized. In an embodiment where the device is flexible, a porous electrode separator can be utilized. In an embodiment, an organic membrane can also be utilized as an electrode separator. Such organic membranes can be fabricated using one of a number of methods, including but not limited to, thermally induced phase separation (TIPS), solvent induced phase separation (SIPS), polymerization induced phase separation (PIPS), or by etching a polymer film to make it porous. An embodiment of a porous membrane can be found in United States Patent Application Publication No. 20080128287, the disclosure of which is incorporated herein by reference Electrochromic articles discussed and exemplified herein can, but need not be optically transparent. Optically transparent electrochromic articles can advantageously be used for certain applications where electrochromic articles that are not optically transparent would be less desirable. Examples of such applications include, but are not limited to those where the use of different colors may be important including, but not limited to, clothing such as camouflage clothing; color filtering applications, such as lighting, photography and glasses; signage or display applications such as tiled displays and pixilated displays.

Further examples of such applications include, but are not limited to, those where on and off transmission control may be important, including building applications, such as doors, privacy walls, windows and wall ceiling tiles; transportation applications such as marine windows; and aircraft applications such as partitions and windows.

EXAMPLES

Example 1

3.6 g of a 10% by weight stock solution of Methocel EM4 (Dow Chemical Company, Midland, Mich.) in water was combined with 12.6 g water to produce a homogenous solution. 20 g Celnax CX-S401 M (Dispersion of 40 wt % Phosphorus doped tin oxide ($SnO_2$) particles in Methanol) from Nissan Chemical America Corporation (Houston Tex.)) was added thereto and the jar was sealed and mechanically shaken for one to two days at room temperature to provide a clear, viscous electrode coating solution (23% solids).

The electrode coating solution was coated, at various thicknesses (seen in Table 1 below), onto 100 ohms/sq ITO/PET (Techni-met Windsor, Conn.) and immediately dried for 3 to 4 minutes at 110° C. in a forced air oven. Comparative example 1a was made in the same way except that the coating was dried in a non-ventable oven. Comparative example 1b was made in the same way except that it was air dried at room temperature.

The conductivities of the coated substrates were measured by a Model 880 ETS Surface Resistivity meter or by a Prostat PRS-801 Resistivity System. The percent haze values of the coated substrates were measured by a Gardner HazeGard Plus device. The percent clarity values of the coated substrates were measured by a Gardner HazeGard Plus device. The percent total transmission was measured using the Gardner HazeGard Plus and percent transmission at 550 nm were measured by a Lambda 900 Spectrometer. The adhesion of the electrode layers was also evaluated though the use of a cross hatch adhesion test using a Gardco PA2000 test instrument loaded with a PA-2053 blade assembly. The adhesion test method used is ASTM #D 3359 with 3M 610 tape, with 0 corresponding to bad adhesion and 5 corresponding to excellent adhesion. Results can be seen in Table 1 below.

TABLE 1

|  | Example 1a | Example 1b | Example 1c | Example 1d | Example 1e | Comparative Example 1 | Comparative Example 1b |
|---|---|---|---|---|---|---|---|
| Drying Method | 110° C. forced air oven | 110° C. forced air oven | 110° C. forced air oven | 110° C. forced air oven | 110° C. forced air oven | Non forced air oven | Air dry at room temp |
| Mayer Rod | 12 | 18 | 24 | 26 | 75 | 18 | 75 |
| Wet Coating Thickness (mil) | 0.52 | 0.70 | 1.13 | 1.43 | 3.0 | 0.70 |  |
| Dry Coating Thickness (mil) | 0.12 | 0.18 | 0.26 | 0.33 | 0.69 | 0.16 | No adhesion |

TABLE 1-continued

| | Example 1a | Example 1b | Example 1c | Example 1d | Example 1e | Comparative Example 1 | Comparative Example 1b |
|---|---|---|---|---|---|---|---|
| Conductivity (ohms/square) | 10E3 | 10E3 | 10E3 | 10E3 | Not available | 10E3.9 | |
| Haze (%) | 1.16 | 1.27 | 1.15 | 1.55 | 1.28 | 23.2 | |
| Clarity (%) | 99.7 | 99.7 | 99.6 | 99.5 | 99.6 | 98.8 | |
| Total Transmission (%) | 86.0 | 86.3 | 86.1 | 85.9 | 85.1 | 86.4 | |
| Transmission at 550 nm (%) | 84.6 | 83.9 | 84.3 | 84.5 | Not available | 83.3 | |
| Adhesion | 5 | 5 | 5 | 5 | 5 | 3 | 0 |

Example 2

A working electrode was fabricated onto 35 ohms/squ ITO/PET (3M Company, St. Paul, Minn.) by electrochemical deposition of a 0.001 M-0.100 M solution of 3,3-diethyl-3,4-dihydro-2H-thieno[3,4-b][1,4]dioxepene (Sigma-Aldrich Co., St. Louis, Mo.) and 0.1 M LiClO$_4$ in dry acetonitrile in a glove box. The counter electrode was prepared by hand coating a solution of phosphorus-doped SnO$_2$ paste with a 24 Mayer rod onto 100 ohms/square ITO/PET substrate.

A curable electrolyte was prepared as follows. In a glove box, a 60 cc opaque jar was charged with poly(ethylene glycol) methyl ether acrylate (Sigma-Aldrich, St. Louis, Mo.) (18.90 g), a propylene carbonate/ethylene carbonate mixture (Sigma-Aldrich, St. Louis, Mo.) (35.68 g of a 4:3 mass % mixture) and LiClO$_4$ (5.82 g) while magnetically stirring. Next, Aerosil 200 fumed silica (Degussa AG, Dusseldorf, Germany; dried under vacuum at 150° C. for at least 3 hours before use) (3.85 g) was added slowly over a period of 24 hours with continued stirring. 2,4,6-Trimethylbenzoylethoxyphenylphosphine oxide (BASF Corporation) (TPO-L: 0.0514 g) and isooctylthioglycolate (Sigma-Aldrich, St. Louis, Mo.) (IOTG: 0.141 g) were then mixed in to give a curable electrolyte composition. 2.0 mass % glass beads of diameter 50 micrometers were added to about 5 g of the electrolyte.

Figure 4:
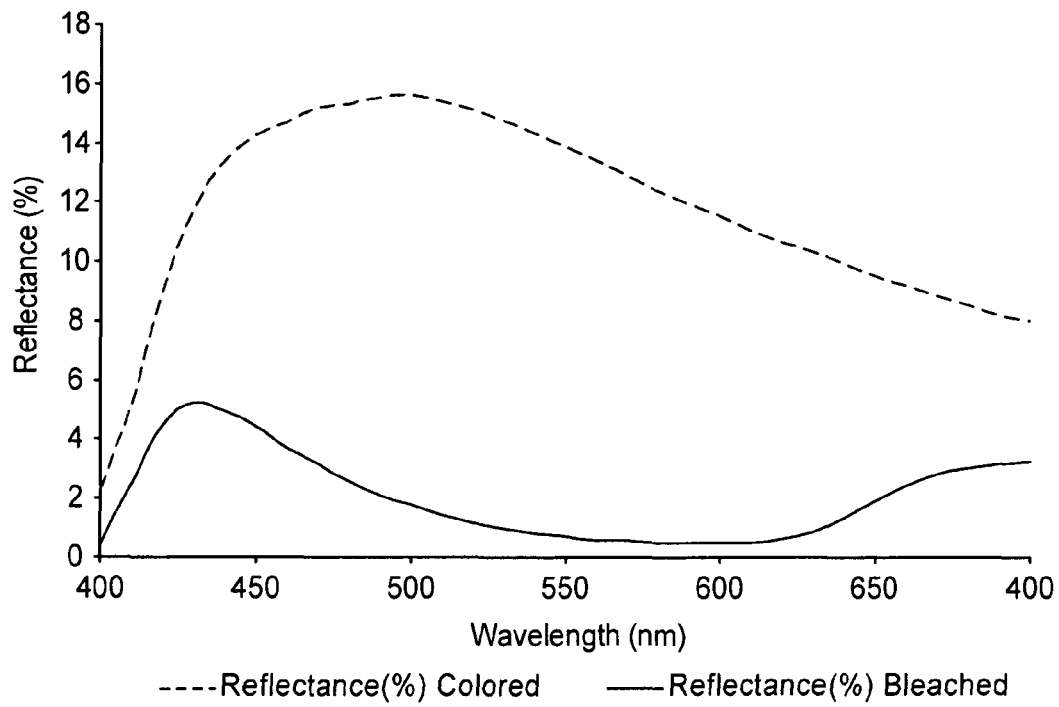
FIG. 4 is a reflectance spectra of the electrochromic article prepared in Example 2.
Figure 5:
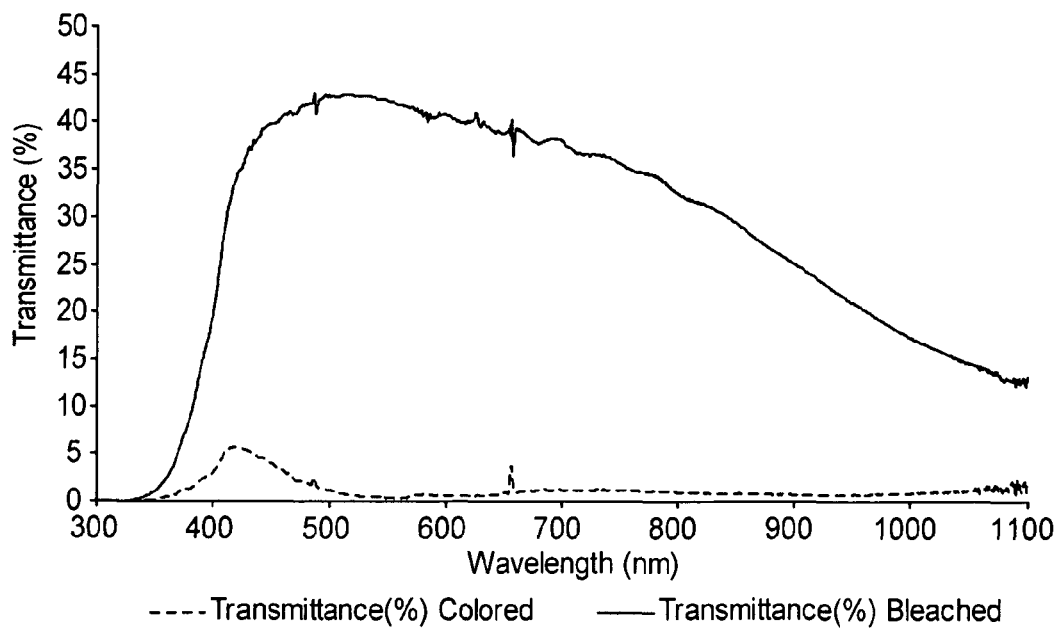
FIG. 5 is a transmission spectra of the electrochromic article prepared in Example 2.

The electrolyte was sandwiched between the working electrode and the counter electrode and the edges were sealed with UV curable polyurethane adhesive Ultra Light-Weld 3-20741 (Dymax Corporation, Torrington, Conn.). The construction was cured for 10 minutes under a GE black light. (1.4 mW/cm$^2$) The cell was readily and repeatably switched from the colored to the bleached state. The bias for switching was ±1.2 V. Reflectance curves for the bleached and colored states (measured against a white background) were obtained with an X-RITE Model SP62 portable sphere spectrophotometer and are shown in FIG. 4. The contrast ratio was 25 at 580 nm. The transmittance spectra were also obtained and are shown in FIG. 5.

Example 3

A device consisting of 21 individually addressed segments was prepared from a pre-patterned 100 ohms/square ITO/PET substrate. A working electrode was prepared by electropolymerizing polydiethylpropyl-dioxythiophene on an ITO/PET substrate by applying a 5 V bias vs. a stainless steel electrode in an acetonitrile solution containing 0.001 M-0.100 M 3,3-diethyl-3,4-dihydro-2H-thieno[3,4-b][1,4] dioxepene and 0.1 M lithium perchlorate for 10 seconds. The counter electrode was prepared by hand coating a solution of phosphorus-doped SnO$_2$ paste with a 24 Mayer rod onto 100 ohms/square ITO/PET substrate. The curable electrolyte of Example 2 was laminated in between the two electrodes and the edges were sealed with Dymax ultra light weld 3-20741 adhesive. The construction was cured for 10 minutes under a GE black light to give an electrochromic cell. The segmented cell was readily switched repeatedly (1,000,000 cycles) from the colored to the bleached state. The bias for switching was ±1.0V with a switching speed of less than one second.

Example 4

A 6×6 inch device was prepared from 5 ohms/square glass substrates. Polydiethyl-propyldioxythiophene was electrodeposited on an ITO/PET substrate by applying a 1.6 V bias vs. a stainless steel electrode in an acetonitrile solution containing 0.001 M-0.100 M 3,3-diethyl-3,4-dihydro-2H-thieno[3,4-b] [1,4]dioxepene and 0.1 M lithium perchlorate for 10 seconds. The counter electrode was prepared by hand coating a solution of phosphorus-doped SnO$_2$ paste with a 24 Mayer rod. The curable electrolyte of Example 2 containing 50 micrometer glass beads was laminated in between the two electrodes and the edges were sealed with Dymax ultra light weld 3-20741 adhesive. The construction was cured for 10 minutes under a GE black light to give an electrochromic cell. The bias for switching was ±1.5V with a switching speed of less than two seconds.

Thus, embodiments of electrochromic devices are disclosed. One skilled in the art will appreciate that the present disclosure can be practiced with embodiments other than those disclosed. The disclosed embodiments are presented for purposes of illustration and not limitation, and the present disclosure is limited only by the claims that follow.

What is claimed is:

1. An electrode comprising:
   a transparent flexible substrate having a first and second surface, wherein the substrate comprises: polyethylene terephthalates (PETs), polyimides, polyethylene naphthalates (PENs), polycarbonate, poly(ether etherketone) (PEEK), poly (ether sulfone) (PES), polyarylates (PAR), or polycylic olefin (PCO);
   a conductive layer disposed on the second surface of the substrate;
   an electrode layer disposed on the conductive layer, wherein the electrode layer comprises doped tin oxide nanoparticles and an organic binder, wherein the electrode layer is transparent.

2. The electrode according to claim 1, wherein the tin oxide is doped with phosphorus.

3. The electrode according to claim 1, wherein the tin oxide nanoparticles have an average size of not greater than about 30 nanometers.

4. The electrode according to claim 1, wherein the tin oxide nanoparticles have an average size of not greater than about 20 nanometers.

5. The electrode according to claim 1, wherein the organic binder is methylcellulose, polyvinyl alcohol (PVA), polyacrylic acid (PAA), poly (meth)acrylate, polyethylene oxide (PEO), hydroxypropyl methyl cellulose, hydroxyethyl cellulose, or combinations thereof 6. The electrode according to claim 1, wherein the organic binder makes up from about 1% to about 15% of the total weight of the electrode layer.

7. The electrode according to claim 1, wherein the organic binder makes up from about 4% to about 8% of the total weight of the electrode layer.

8. The electrode according to claim 1, wherein the nanoparticles make up from about 85% to about 99% of the total weight of the electrode layer.

9. The electrode according to claim 1, wherein the nanoparticles make up from about 92% to about 96% of the total weight of the electrode layer.

10. An electrochromic article comprising:
a counter electrode comprising:
  a transparent flexible substrate having a first and second surface, wherein the substrate comprises: polyethylene terephthalates (PETs), polyimides, polyethylene naphthalates (PENs), polycarbonate, poly(ether etherketone) (PEEK), poly (ether sulfone) (PES), polyarylates (PAR), or polycylic olefin (PCO);
  a conductive layer disposed on the second surface of the substrate; and
  an electrode layer disposed on the conductive layer, wherein the electrode layer comprises doped tin oxide nanoparticles, and an organic binder, wherein the electrode layer is transparent; and
an electrolyte layer disposed on the counter electrode.

11. The electrochromic article according to claim 10, wherein the tin oxide is doped with phosphorus.

12. An electrochromic article according to claim 10 further comprising a working electrode disposed on the electrolyte layer.

* * * * *

UNITED STATES PATENT AND TRADEMARK OFFICE
CERTIFICATE OF CORRECTION

| | | |
|---|---|---|
| PATENT NO. | : 8,179,587 B2 | Page 1 of 1 |
| APPLICATION NO. | : 12/340915 | |
| DATED | : May 15, 2012 | |
| INVENTOR(S) | : Brian T Weber | |

It is certified that error appears in the above-identified patent and that said Letters Patent is hereby corrected as shown below:

Column 12
Line 59, Claim 1, delete "polycylic" and insert -- polycyclic --, therefor.

Column 13
Line 11, Claim 5, after "thereof" insert -- . --.

Column 14
Line 8, Claim 10, delete "polycylic" and insert -- polycyclic --, therefor.

Signed and Sealed this
Twenty-first Day of August, 2012

David J. Kappos
*Director of the United States Patent and Trademark Office*